J. A. SHARP.
FERTILIZER DISTRIBUTER.
APPLICATION FILED OCT. 24, 1913.
1,225,873.
Patented May 15, 1917.
2 SHEETS—SHEET 2.
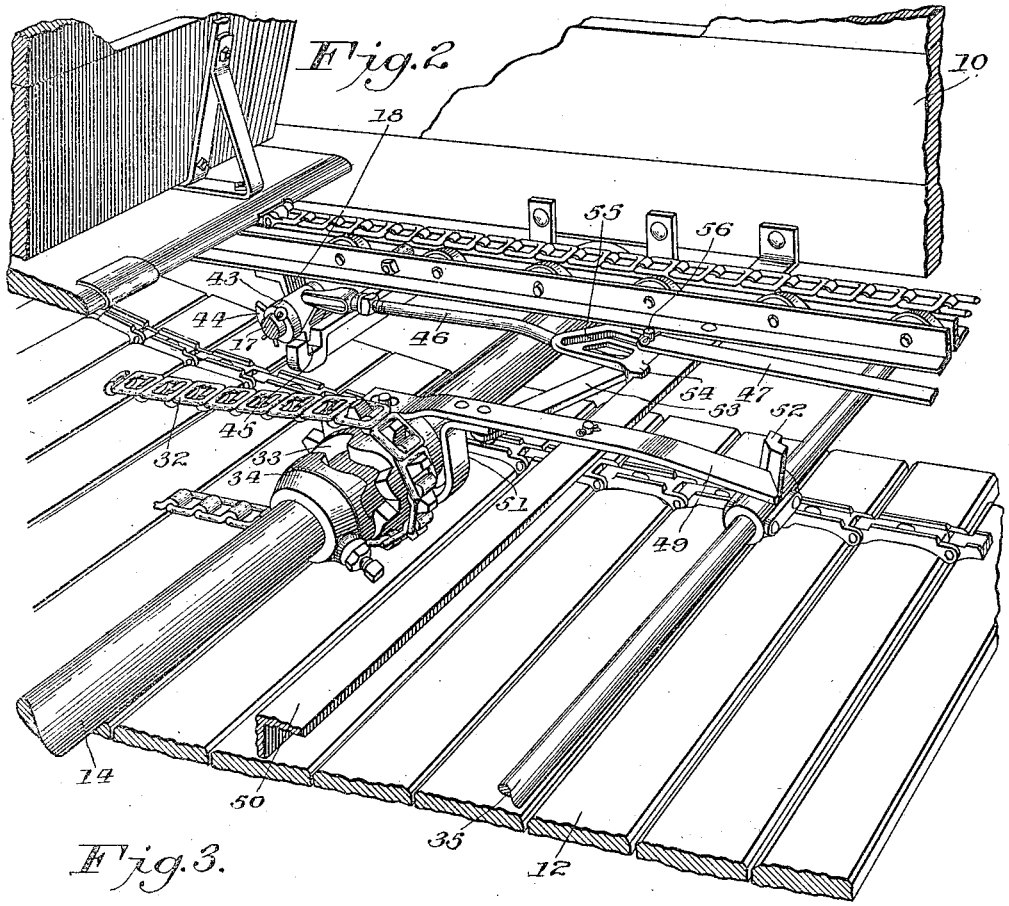
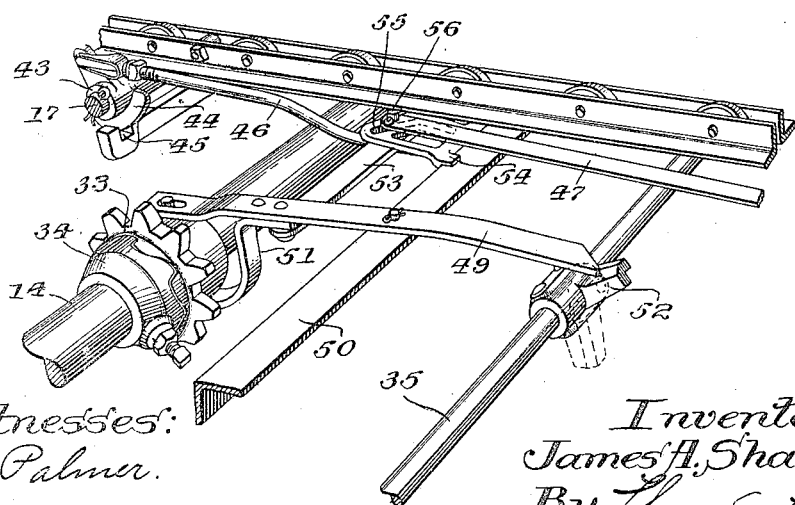
Witnesses:
E. C. Palmer.
W. W. Loftus
Inventor:
James A. Sharp,
By Chas. E. Lord
Atty.

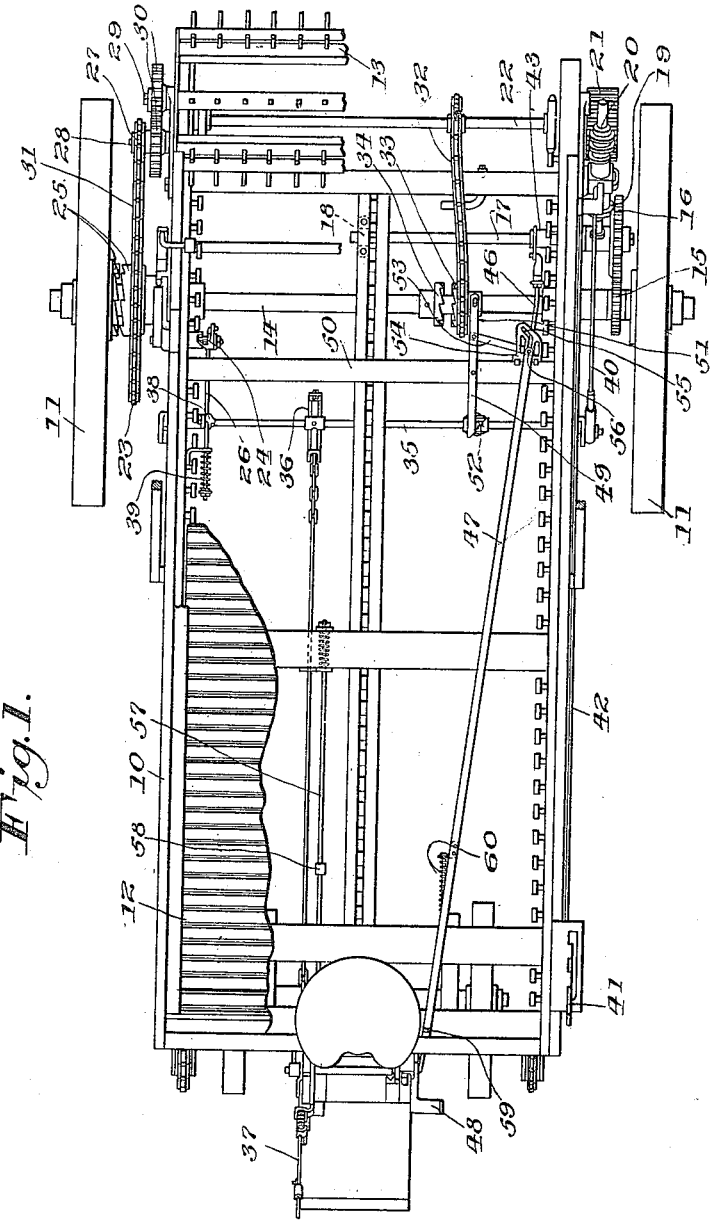

UNITED STATES PATENT OFFICE.

JAMES A. SHARP, OF SPRINGFIELD, OHIO, ASSIGNOR TO INTERNATIONAL HARVESTER COMPANY OF NEW JERSEY, A CORPORATION OF NEW JERSEY.

FERTILIZER-DISTRIBUTER.

1,225,873.

Specification of Letters Patent.

Patented May 15, 1917.

Application filed October 24, 1913. Serial No. 797,044.

*To all whom it may concern:*

Be it known that I, JAMES A. SHARP, a citizen of the United States, residing at Springfield, in the county of Clark and State of Ohio, have invented certain new and useful Improvements in Fertilizer-Distributers, of which the following is a full, clear, and exact specification.

My invention relates to fertilizer distributers of the reverse apron type. It is my object to prevent accidental breaking of the driving parts of a device of this class and to effect, in a positive manner, the proper sequence of action on the part of the shifting means for the forward and reverse driving clutches and gears. This object I accomplish by the employment of means operative in connection with the various clutches and gears to prevent throwing of the reverse clutch members into engagement when the forwardly driving gears are in operation, and vice versa, and also means which permit the variable speed gears and reverse clutch members to be shifted from a single lever whereby the former may be moved for the purpose of permitting a change of speed to be effected without imparting any movement to the latter. One form which my invention may assume is exemplified in the following description and illustrated in the accompanying drawings, in which—

Figure 1 shows a plan view of a manure spreader with a portion of the apron removed therefrom to show the operative parts;

Fig. 2 shows a perspective view of a portion of the rear axle and its associated parts, illustrating the improved clutch shifting mechanism employed in my device; and Fig. 3 shows a view similar to that shown in Fig. 2 except that the reverse clutch members are shown in a different position.

Such parts of a fertilizer distributer as are essential to a full understanding of my device are shown in the drawings, and among others they comprise a body portion 10, carrying wheels 11, an apron 12, and beater 13. Power for driving the apron and beater is obtained from the axle 14 of the rear carrying wheels, and in the case of the apron, transmission is derived through a spur gear 15 fixed to said axle at one end thereof; an intermeshing spur and disk gear 16 of a type common in distributers for obtaining a variable speed of the apron, said disk gear being fixed on a short shaft 17, which shaft is slidably mounted in bearings 18 rearwardly of the axle; a pinion 19 adapted to mesh with the concentric gear teeth on the disk 16 slidable upon a worm shaft 20; and a worm gear 21 fixed to the apron operating shaft 22 and arranged in position to be driven by the worm shaft 20. The beater is driven from the opposite end of the axle through a sprocket wheel 23 clutched to the adjacent ground wheel and slidable upon the axle by means of a cam arrangement 24, in a manner to engage and disengage the clutch members 25 as the rod 26 is reciprocated. A sprocket pinion 27, carried on a stub shaft 28, is geared to the beater shaft 29 through spur gears 30, and a sprocket chain 31 completes the connection.

For reversing the direction of the apron after it has reached its rearward limit of movement, a sprocket gear and chain arrangement 32 is employed between the axle and the apron shaft. The sprocket gear on the axle carries a clutch member 33 and is slidable in a manner to engage and disengage with a coacting clutch member 34 fixed to said axle. A transverse rock shaft 35 is arranged in front of the axle and carried on said rock shaft is a sector 36, which sector is flexibly connected with a hand operated lever 37 mounted forwardly of the machine adjacent to the driver's seat; said flexible connection being arranged so that the rock shaft is moved in one direction only by the lever. For movement in the opposite direction the rock shaft is connected with a two-arm lever 38, which in turn has one arm connected to a spring-actuated rod 39 and its other arm connected to the rod 26 which shifts the beater driving mechanism in and out of operative position. One end of the rock shaft has a crank arm and link connection 40 with a swinging cam which, in operation, raises and lowers the worm shaft 20 in and out of engagement with the worm gear 21 for the purpose of throwing the apron forward-drive in and out of gear simultaneously with the beater drive. A hand lever 41, arranged near the forward end of the machine, is connected by a link 42 to the pinion 19 in a manner to shift said pinion longitudinally on its shaft to thereby effect an engagement with different series of gear teeth on the disk 16, and thus a variable speed of the apron is secured. To permit the pinion 19 to be shifted on its shaft, the disk gear 16 is movable with its shaft outwardly. This movement is effected by means of a sleeve 43 carrying a spirally arranged rib 44, which rib enters a groove 45 formed in a projecting portion of the adjacent stationary bearing 18. Rotation of the sleeve 43 slides the shaft in its bearings, carrying with it the disk gear 16, and this rotation of the sleeve is secured through a link 46 pivoted to a slidable bar 47, which in turn is connected to a foot lever 48 mounted on the body of the machine forwardly thereof.

All of the parts just described are of a well-known construction and a full disclosure of the same may be found in Patent No. 873,030, issued to Dennis and Rice, December 10, 1907.

From what has thus far been said, it will be seen that the shifting mechanism for the forwardly driving apron gears operates independent of the reverse gear shifting device and, therefore, danger is imminent that an inexperienced operator upon becoming confused might move the operating levers to throw the reverse driving gears in operation, while at the same time the forwardly driving gears were operating, and thereby severe injury of the parts would occur. This danger is eliminated by the employment of my improved safety device, which is here shown as applied to a particular type of fertilizer distributer, but, obviously, may be used in connection with many different forms of machines.

This device comprises a lever 49, pivoted intermediate its ends to a cross sill 50 of the body and provided with a forked end 51 to encompass the hub of the apron reverse-driving gear on the axle 14 in a manner to slide said gear when the lever is moved. The opposite end of the lever is preferably beveled and terminates adjacent to the rock shaft 35. Upon the rock shaft, in position to engage with said lever when moved to position where the reverse clutches are disengaged, is a lug 52, preferably angular in cross section and having its exterior corner beveled. Both the beveled portions on the lever and lug are simply for the purpose of effecting a smooth operation between those parts. A link 53 connects one end of the lever 49 with the bar 47 at a point in common with that of the link 46, and at this point a stationary bracket 54 is arranged having formed within it a cam shaped guideway 55, within which the connecting pin 56 of the three adjacent members is inserted, and thus the path of travel of the bar 47 and connecting parts is controlled. The shape of the guide-way is such that it extends rearwardly for a portion of its distance and then at an angle in a direction to cause the lever 49 to be so moved that it will effect a reëngagement of the clutch members 33 and 34.

The hand lever 37 operates in a manner identical with that shown in the patent before referred to, which is to say that it is provided with a detent disengaging mechanism 57 operated by the travel of the apron when it strikes a depending lug 58 thereon. When the parts are in position for scattering fertilizer, the hand lever occupies an upward position, and as the rear end of the apron reaches the lug 58 it operates the detent disengaging mechanism so that the hand lever is freed from its sector and moved to its lower position by the operation of the spring-actuated rod 39 through the medium of the rock shaft 35. This movement of the rock shaft will disengage the beater driving clutches and the forwardly driving apron gears, and also carry the lug 52 forwardly and downwardly away from the lever 49. The lever 49 being thus freed, the operator next depresses the foot lever 48, moving the bar 47 rearwardly along the guide-way 55 and carrying the link 53 in a direction to engage the clutch members of the reverse drive gear, and the apron is thereby returned as the machine continues its advance over the field. This same movement of the foot lever also shifts the shaft 17 outwardly, causing a disengagement of the disk gear 16 from the driving gear 15, and thus greater provision is made for preventing an opposite strain on the gears and axle even though the worm shaft 20 should by accident reëngage the worm gear.

When the apron nears its forward position, its front end engages a lug 59 on the bar 47, thus carrying the bar forwardly and disengaging the reverse clutch members. Said clutch will, of course, be disengaged before the gears 15 and 16 are reëngaged, and a coil spring 60 on the bar 47 completes the forward movement, thereby raising the foot lever and effecting a proper reëngagement of the gears. In this connection it will also be seen that the first movement of the foot lever operates only to shift the disk gear and its shaft so that in moving said gear to permit the pinion therewith to be shifted to a different speed, no movement whatever is imparted to the reverse gear clutch, and when the rock shaft is in position with the forwardly driving gears in mesh, the reverse clutch shifting lever is positively held against any movement, even though the operator should attempt to depress the foot lever beyond what is necessary to free the disk gear from its pinion. At any time after the foot lever has been returned to its upper position the operator can manually raise the hand lever and lock it in its upright position, and this movement of the lever will effect a reën- gagement of the beater driving clutch and the apron worm drive. However, should an attempt be made to raise this lever before the apron has been completely returned and the reverse gear clutch members have been disengaged, it will be found that this is impossible because of the position of the lug 52, which, it will be seen, will strike the end of the lever 49 and prevent further movement on the part of the rock shaft.

It will be noted that all of the operative parts for driving the apron dischargeward, or for actuating the beater, are controlled by the rock shaft 35, and that the rock shaft is in each instance connected with these parts through rigid means. Obviously, then, any movement to engage or disengage these main driving members must be attended by a corresponding movement of the rock shaft. Therefore, when the lug 52 is pointed downwardly and forwardly the main driving members are certain to be disengaged and the reverse mechanism may safely be set in operation. Whenever it is desired to disengage the reverse mechanism the foot lever 48 is released, and it may happen that the spring 60 will fail to do its work and the shift bar 49 will be unmoved. Should this occur, the main controlling lever, when actuated, will move the rock shaft to position for reëngaging the beater and outward apron drive. The lug 52, which is cam-shaped, moving upwardly will engage the beveled end of the shift bar 49 and positively disengage the reverse mechanism in advance of the reëngagement of the opposed driving mechanism. Thus it will be seen that it is impossible for the parts to become locked even where the springs or other yielding means employed fail to operate.

It is to be understood that by the term "forwardly-driving gears or mechanism," applicant has reference to the gears used for driving the apron toward the beater in a direction for distributing fertilizer as the machine is advancing over the field, and by "reverse gears" is meant those used for returning the apron to position for loading.

While I have shown and described but one form of my device, it is to be understood that it is capable of many modifications and that changes may be resorted to without departing from the spirit of my invention as disclosed in the appended claims.

What I claim as my invention and desire to secure by Letters Patent is:

1. In a fertilizer distributer, an apron, variable speed driving mechanism therefor including a movable member, means for shifting said movable member, reverse-driving mechanism for said apron, means for shifting said reverse-driving mechanism in and out of operative position, a single operating lever for both of said shifting means, and positive means including a slotted cam control mechanism and in addition a movable locking member for preventing movement of said reverse-gear shifting means when operating said variable speed gear shifting means.

2. In a fertilizer distributer, an apron, variable speed driving mechanism therefor including a movable member, shifting mechanism for said movable member, reverse-driving mechanism for said apron, means for shifting said reverse-driving mechanism in and out of operative relation, an operating lever, a bar connected to said operating lever and to both of said shifting means, and a cam-shaped guiding member for said bar and an additional safety member whereby the variable speed shifting means may be operated without imparting movement to said reverse shifting means.

3. In a fertilizer distributer, an apron, variable speed driving mechanism therefor including a movable member, means for shifting said movable member, means for shifting said variable speed driving mechanism out of operative relation with the apron, reverse-driving mechanism for said apron, including a movable clutch member, shifting means for controlling said movable clutch member, and means including two separate control members, at least one of which is controlled by the position of said driving-gear shifting means for positively preventing movement of said reverse driving clutch member while said variable speed member is being moved.

4. In a fertilizer distributer, an apron, variable speed driving mechanism therefor including a movable member, means for shifting said movable member, a rock shaft for moving said driving mechanism out of operative relation with said apron, reverse driving mechanism for said apron, a lever for shifting said reverse driving mechanism out of operative relation with said apron, an operating lever, a link connected to said lever and to the reverse-gear shifting lever, shifting means for said movable driving member connected to said operating lever, a cam-shaped guiding member for said connecting link and lever whereby the movable driving member may be shifted without imparting movement to the shifting mechanism for said reverse mechanism, and additional means to prevent movement of the shifting mechanism for said reverse mechanism under certain conditions.

5. In a fertilizer distributer, an apron, forwardly-driving mechanism therefor, shifting means for said driving mechanism, a rock shaft for operating said shifting means, reverse-driving mechanism for said apron, a horizontal lever for shifting said reverse-driving mechanism in and out of operative relation, and a lug on said rock shaft adapted to engage said lever for preventing operation of said reverse driving mechanism when the forwardly-driving mechanism is in operative position.

6. In a fertilizer distributer, an apron, driving mechanism therefor, shifting means for said driving mechanism, a transverse rock shaft beneath said distributer for operating said shifting means, reverse-driving mechanism for said apron, a lever for shifting said reverse-driving mechanism in and out of operative position, automatic means for operating said rock shaft, and means on said shaft to prevent movement of said shifting lever when the driving gears are in operative position.

7. In a fertilizer distributer, an apron, a variable speed drive therefor including a movable member, means for shifting said movable member, means for shifting said variable speed drive in and out of operative relation with said apron, reverse driving mechanism for said apron, shifting means for the reverse driving mechanism, and means including two separate control mechanisms for positively preventing movement of said reverse shifting means while the forward drive is in operative position and while the movable member on said variable speed drive is being operated.

8. In a fertilizer distributer, an apron, variable speed driving mechanism for said apron including a movable member, shifting means for said movable member, means for shifting said driving mechanism in and out of operative relation with said apron, a rock shaft beneath said distributer for operating said last mentioned shifting means, reverse driving mechanism for said apron, shifting means for said reverse mechanism, and means controlled by said rock shaft for preventing movement of said reverse shifting mechanism while said variable speed driving mechanism is in operative position and while said movable member is being shifted.

9. In a fertilizer distributer, an apron, driving mechanism for moving said apron to discharging position, manually operated means including a rock shaft for controlling said driving mechanism for returning said apron to its normal position, a shift bar manually operated for controlling said return driving mechanism, and means on the rock shaft to coact with the shift bar for insuring the disconnection of said return driving mechanism when the rock shaft is operated to throw the forward driving mechanism into working position.

10. In a fertilizer distributer, an apron, driving mechanism for moving said apron outward to discharging position, means including a rock shaft for controlling said driving mechanism, driving mechanism for returning said apron to normal position, a manually operated shift bar for controlling said return driving mechanism, said shift bar being provided with a beveled end, and a cam-lug carried upon said rock shaft to coact with the beveled end of said shift bar for positively insuring a sequential movement of the driving mechanisms.

In testimony whereof I affix my signature, in the presence of two witnesses.

JAMES A. SHARP.

Witnesses:
R. M. HOLLENBECK,
W. B. KENDIG.

Copies of this patent may be obtained for five cents each, by addressing the "Commissioner of Patents, Washington, D. C."